(12) United States Patent
Benkreira et al.

(10) Patent No.: US 12,106,264 B2
(45) Date of Patent: Oct. 1, 2024

(54) CROWDSOURCED INSIGHTS ABOUT MERCHANT SHIPPING METHODS

(71) Applicant: Capital One Services, LLC, McLean, VA (US)

(72) Inventors: Abdelkader M'hamed Benkreira, New York, NY (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 743 days.

(21) Appl. No.: 17/004,487

(22) Filed: Aug. 27, 2020

(65) Prior Publication Data
US 2022/0067655 A1 Mar. 3, 2022

(51) Int. Cl.
| | | |
|---|---|---|
| G06Q 30/0601 | (2023.01) | |
| G06F 8/40 | (2018.01) | |
| G06F 9/451 | (2018.01) | |
| G06N 20/00 | (2019.01) | |
| G06Q 10/083 | (2024.01) | |
| G06Q 10/0833 | (2023.01) | |

(Continued)

(52) U.S. Cl.
CPC ......... G06Q 10/08345 (2013.01); G06F 8/40 (2013.01); G06F 9/451 (2018.02); G06N 20/00 (2019.01); G06Q 10/0833 (2013.01); G06Q 10/0838 (2013.01); G06Q 30/0282 (2013.01); G06Q 30/0627 (2013.01); G06Q 30/0641 (2013.01)

(58) Field of Classification Search
CPC ......... G06Q 10/08345; G06Q 10/0833; G06Q 10/0838; G06Q 30/0282; G06Q 30/0627; G06Q 30/0641; G06F 8/40; G06F 9/451; G06N 20/00; G06N 3/045; G06N 3/047; G06N 3/08

USPC ......................................................... 705/7.31
See application file for complete search history.

(56) References Cited

U.S. PATENT DOCUMENTS

| | | | | |
|---|---|---|---|---|
| 5,966,126 A | * | 10/1999 | Szabo ................... | G06F 16/338 |
| | | | | 707/E17.082 |
| 10,937,046 B1 | * | 3/2021 | Henderson ......... | G06Q 30/0641 |
| 2006/0085408 A1 | * | 4/2006 | Morsa ................ | G06Q 30/0256 |

(Continued)

OTHER PUBLICATIONS

Vitality Medical Launches New Shopper-Friendly Medical Supply Website. PRWeb Newswire Feb. 24, 2011: NA.*

(Continued)

*Primary Examiner* — Timothy Padot
(74) *Attorney, Agent, or Firm* — Banner & Witcoff, Ltd.

(57) ABSTRACT

Aspects described herein may allow for the application of machine learning techniques to the classification of transactions and/or the prediction of shipping means for such transactions. This may have the effect of generating better insights into user shopping behavior and providing users with better predictions as to how they may expect to receive their purchases. A browser application may be monitored to determine that a user is shopping. A machine learning model may be used to predict shipping data associated with a product and/or merchant associated with the shopping of the user. Predicted shipping data may be displayed to the user, and user feedback may be requested and received to confirm model predictions and review purchases and shipping experiences.

21 Claims, 5 Drawing Sheets

(51) Int. Cl.
    *G06Q 10/0834*     (2023.01)
    *G06Q 30/0282*     (2023.01)

(56)            References Cited

U.S. PATENT DOCUMENTS

2008/0040653 A1*  2/2008  Levine ................... G06Q 30/02
                                                          705/14.69
2013/0332253 A1* 12/2013  Shiffert .............. G06Q 30/0255
                                                          705/14.26
2015/0082216 A1*  3/2015  Dai ..................... G06F 3/04883
                                                            715/767
2015/0088851 A1*  3/2015  Deshpande ......... G06F 16/9535
                                                            707/708
2017/0091320 A1*  3/2017  Psota .................. G06F 16/3337
2017/0116562 A1*  4/2017  Schroeder ............ G06Q 10/083
2019/0230070 A1*  7/2019  Isaacson ............. H04W 12/084
2021/0090017 A1*  3/2021  Reiss ................. G06Q 10/0833
2021/0182754 A1*  6/2021  Smith ............. G06Q 10/06315

OTHER PUBLICATIONS

Amazon: quick checkouts with PayPhrase. Ricknas, Mikad. PC World28.1: 26(1). PC World Communications, Inc. (Jan. 2010).*

* cited by examiner

CROWDSOURCED INSIGHTS ABOUT MERCHANT SHIPPING METHODS

FIELD OF USE

Aspects of the disclosure relate generally to machine learning and the crowdsourcing of data. More specifically, aspects of the disclosure may provide for enhanced training of models to classify credit card transactions and shipping means of a product.

BACKGROUND

E-commerce may allow consumers to purchase goods and/or services over networks, like the Internet. Goods may be picked up by a user (e.g., in-person or through a delegate) or shipped to a delivery address specified by the user. Shipping techniques, such as the courier service used for delivery, may impact the user's decision to purchase. However, it is difficult for the purchaser to know the courier service (e.g., delivery service) in advance of making a purchase. Moreover, shipping details may be difficult to accurately predict based on a single transaction. Moreover, merchants may use a plurality of courier services to deliver their goods, further compounding the uncertainty regarding shipping details. This ultimately leads to consumer frustration and lost sales.

Aspects described herein may address these and other problems, and generally improve online transactions by providing data and/or information obtained from machine learning models based on data and information aggregated from other transactions and/or users.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the application of machine learning techniques to the classification of online transactions and/or the prediction of shipping means associated with the online transactions. This may have the effect of generating better insights into user shopping behavior and providing users with better expectations as to how they may receive their purchased products. According to some aspects, these and other benefits may be achieved by analyzing transaction information and user feedback. In one example, a browser application (e.g., browser extension) may analyze a user's browsing to identify potential transactions and display predicted shipping information to the user. Users may also interact with the browser application (e.g., browser extension) to set preferences and/or customize their experiences.

Additionally, aspects disclosed herein may describe training a model to classify transactions and/or predict shipping information for a user. The model may be initialized with having a plurality of online transaction parameters. A training set comprising a plurality of past online transactions (e.g., credit card, debit card, gift card, electronic payment service (e.g., Apple® Pay, Samsung® Pay, etc.), etc.) may be determined and used to train the model. Training the model may comprise a plurality of iterations to refine the plurality of online transaction parameters. After the model has been trained, the model may be deployed, for example—via a browser application or browser extension, and used to monitor use of a browser application. Based on the monitoring, the model may determine that the user is accessing a website via the browser application. The website may be analyzed, and the model may determine that the user is shopping for a good (e.g., product) from an online merchant. Using the product and online merchant, the model may classify the product as a physical product to be shipped to the user. The model may also predict shipping data associated with the physical product and/or the online merchant. Based on the prediction, the model may cause the shipping data to be displayed. After the transaction has completed, user feedback may be requested and received to confirm model predictions and review purchases and shipping experiences.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope of the present disclosure. Aspects of the disclosure are capable of other examples and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for training a machine learning model to classify transaction data and/or predict shipping data. Transaction data may be aggregated from a plurality of transactions. Shipping data may be aggregated from a plurality of merchants. User responses may be aggregated to support the transaction data and/or the shipping data. As discussed further herein, the unconventional combination of steps and/or features may improve the training of machine learning models to predict relevant information associated with the products and display the relevant information to users contemplating purchase of a product. By providing relevant information, and in particular-relevant shipping information based on information aggregated from a plurality of sources, the unconventional steps and/or features provide additional information related to shipping to influence a user's purchasing decision and improve electronic commerce (e-commerce).

Before discussing these concepts in greater detail, several examples of a computing device that may be used in implementing and/or otherwise providing various aspects of the disclosure will first be discussed with respect to FIG. 1.

Figure 1:
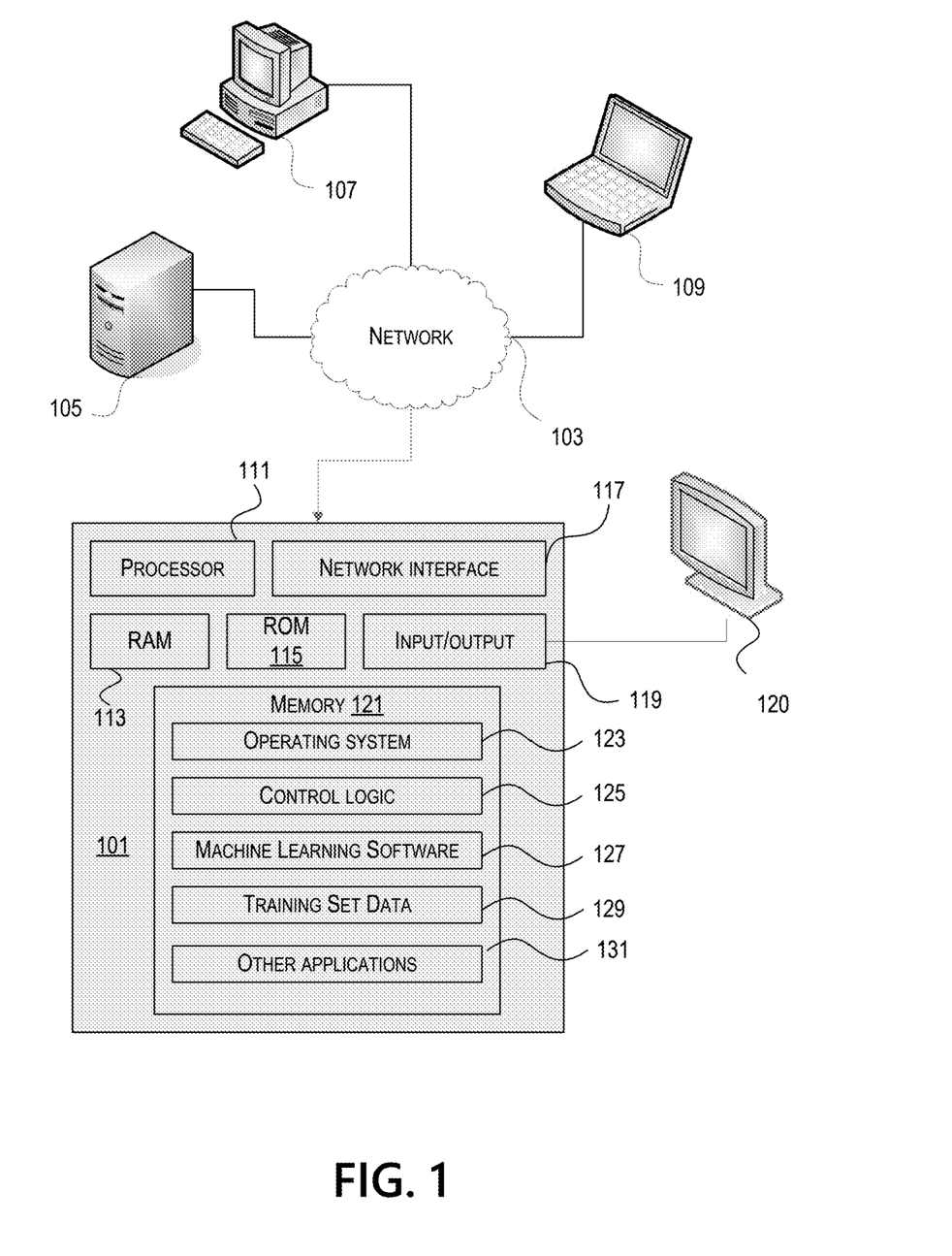
FIG. 1 shows an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some examples, implement one or more aspects of the disclosure by reading and/or executing instructions and performing one or more actions based on the instructions. In some examples, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal area networks (PAN), wide area networks (WANs), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Computing device 101 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Processor 111 may comprise a single central processing unit (CPU), which may be a single-core or multi-core processor, or may comprise multiple CPUs. Processor(s) 111 and associated components may allow the computing device 101 to execute a series of computer-readable instructions (e.g., instructions stored in RAM 113, ROM 115, memory 121, and/or other memory of computing device 101, and/or in other memory) to perform some or all of the processes described herein including, for example, the machine learning processes.

I/O 119 may include a variety of interface units and/or drivers for reading, writing, displaying, and/or printing data or files. I/O 119 may be coupled with a display such as display 120. Input/output (I/O) device 119 may also comprise a microphone, keypad, touch screen, and/or stylus through which a user of the computing device 101 may provide input, and may also comprise one or more of a speaker for providing audio output and/or a video display device for providing textual, audiovisual, and/or graphical output.

Network interface 117 may comprise one or more transceivers, digital signal processors, and/or additional circuitry and software, protocol stack, and/or network stack for communicating via any network, wired or wireless, using any protocol as described herein.

Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. The various hardware memory units in memory 121 may comprise volatile and nonvolatile, removable and non-removable media implemented in any method or technology for storage of information such as computer-readable instructions, data structures, program modules, or other data. Memory 121 may comprise one or more physical persistent memory devices and/or one or more non-persistent memory devices. Memory 121 may comprise random access memory (RAM) 113, read only memory (ROM) 115, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 111.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium similar to those discussed above with respect to memory 121. As noted above, the computer readable medium (e.g., memory 121) may comprise a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

In other examples, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. It will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

As discussed above, machine learning models may be used to predict additional information associated with a purchase. The machine learning models may be trained to deliver relevant information to users that may be contemplating the purchase of a good and/or product.

Online transactions may be classified via a plurality of techniques. For example, one such technique may include a transaction being classified as "card present" or "card not present." A classification of "card present" may indicate a transaction card was physically present for the transaction, such as when a user presents a credit card to a cashier when purchasing a product at a store. A classification of "card not present" may indicate that a transaction card was not physically present for the transaction, such as when the user types credit card information into a form when purchasing a product from an online merchant. Such classifications may be helpful in determining whether a product is to be shipped to the user. For example, a "card present" classification may indicate that the user physically received the product from the store, while a "card not present" transaction may indicate that the product will be shipped to the user.

While a transaction classification (e.g., "card present" vs. "card no present") may be helpful in determining whether a purchased product will be shipped, such a determination may not be dispositive. For example, in a "card present" transaction, a user in a physical store may purchase a product that is to be shipped to the user at a later time, such as for an out-of-stock product or a product with dimensions too large to fit in the user's vehicle. In another example, a store may keep a copy of the user's card on file to charge when the user purchases a product in that store, resulting in a "card not present" transaction though the user leaves the store carrying the product. More data may be needed to provide additional insights into a transaction.

A merchant name may be indicated as part of a transaction and may provide valuable insights into classifying the transaction. For example, a merchant with a ".com" in its name may indicate that the merchant is an online merchant and the purchased goods and/or products will shipped to a user, while a merchant such as "Home Depot" may have a higher probability of the user leaving the merchant with the purchased product(s) physically in-hand. Whether a good is being shipped or being carried out by the user may be determined from a history of transactions associated with those merchant names, from user feedback, and/or from being hard-coded into a classification method.

A merchant's type may also provide additional information with respect to classifying a card transaction. For example, certain types of merchants may have a higher probability of shipping products than other types of merchants. For example, an online-only merchant may be more likely to ship products than a hardware store. A merchant type may be determined based on various criteria associated with the merchant, such as a history of products purchased from the merchant, merchant names known to be associated with one or more types of products, hard-coded data, and/or other criteria that may be useful, such as user feedback. A merchant type may be a term and/or keyword describing the merchant. A merchant type may be selected from types enumerated by users and/or data aggregators. Example merchant types may include one or more of the following: online; electronics; clothing; groceries; hardware; pets; subscription; streaming; and/or department. Other example merchant types may also be assigned or selected by one or more users.

A product name and/or type of a product may provide additional insights into transactions to better classify those transactions. Data indicating a product name and/or type may be associated with a transaction. For example, a completed credit card transaction may indicate one or more products purchased in the following manner: "exampleStore.com laptop $500," or any other manner that conveys purchased product information. A product name and/or type may be associated with a shipped product, such as products that may be too large for a typical user to carry home, like a refrigerator and/or other large appliance. In such an instance, the product name might include "refrigerator" or a brand name of a refrigerator, and additionally or alternatively, "refrigerator" may be indicated as the product type. In either case, the product name and/or type may provide insight into whether the purchased product may be shipped to the user. Other product names and/or types may indicate that the product may not be shipped to the user. For example, digital products, such as streaming services, are not associated with physical products, indicating that they will not be shipped. Information regarding a product name and/or type may be associated with a merchant the product was purchased from. A product name and/or type may be determined based on various criteria associated with the product, such as a merchant the product was purchased from, known product names, known product types, hard-coded data, and/or other criteria that may be useful, such as user feedback. Similar to example merchant types, example product types may include one or more of the following: digital; electronics; clothing; groceries; hardware; pets; subscription; streaming; or home. Other example product types may also be assigned or selected by one or more users.

User feedback may provide additional insights into transactions to better classify those transactions. User feedback may include data gathered from various users during any or all aspects of the purchasing process. For example, user feedback may be gathered regarding a user's experience purchasing a product at a particular store. Such feedback may indicate whether a product was physically received at time of purchase or whether the product was shipped to the user. User feedback may also indicate, or confirm, merchant names, merchant types, product names, and/or product types.

A communication (e.g., a message and/or notification) may be sent to the user to collet user feedback. Such prompting may be provided by a company associated with a credit card involved in the transaction or some other party aggregating data about transactions. For example, a user may receive a questionnaire, for example, in response to conducting a transaction with a transaction card. The questionnaire may ask the user to provide any of the above aspects of information, such as whether or not a product was physically purchased or will be shipped, a name of the merchant, a type of the merchant, a product name of the product, and/or a product type of the product. User feedback may also include data collected from various sensors associated with a user device, such as a global positioning system (GPS) location or a smartphone camera. Sensor data received from the user may also be optional for user privacy. Messages or notifications sent to the user may be optional. Additionally or alternatively, the user may define communication preferences so that a user is not overburdened when making one or multiple transactions. For example, a user may opt-in to such messages. Additionally or alternatively, the communications may be sent if certain conditions are met. These conditions may include transaction data having a specific value or values, an amount charged for the product, a number of transactions made by the merchant, and/or other conditional data set by the user or card issuer. In some examples, the communications may be sent to provide data missing from the transaction.

Data associated with each transaction may be saved. Each transaction may be assigned an identifier. The identifier may be unique from other transactions and may allow for indexing and lookup of a specific transaction. A purchase price of a transaction may also be saved. The purchase price may be useful for classifying merchants, product names, and/or types. Additional data, such as those described above, may be saved alongside a transaction. For example, a "card present" or "card not present" classification, a merchant name, a merchant type, a product name, a product type, and/or relevant user feedback may be saved. In instances where one or more pieces of information for a given transaction are missing and/or unavailable, user feedback, such as from a questionnaire, may be used to retrieve the missing information. Data may be saved in any manner allowing the data to be later accessed. For example, the data may be saved in a database, in computer memory, in a remote location, or any other location computer data may be stored. Table 1 shows a non-limiting example table of transaction data that may be stored in a database, as described herein. It should be appreciated that, as shown, some entries may not be available for every transaction. Some entries may also be filled, or have been already filled, by user feedback and/or confirmed by user feedback. For example, whether a product was shipped may be confirmed by a user to better predict classification of future transactions, as described herein.

information missing from a transaction. For example, a trained machine learning model may be able to fill in the missing "Product Type" category associated with transaction ID "2" in Table 1. User feedback, as described above, may be used to reinforce or correct a machine learning algorithm's predictions and/or determinations. If user feedback contradicts a machine learning algorithm's prediction and/or determination, that contradiction may be used to update the machine learning model so that the model may better predict and/or determine future similar transactions.

Figure 2:
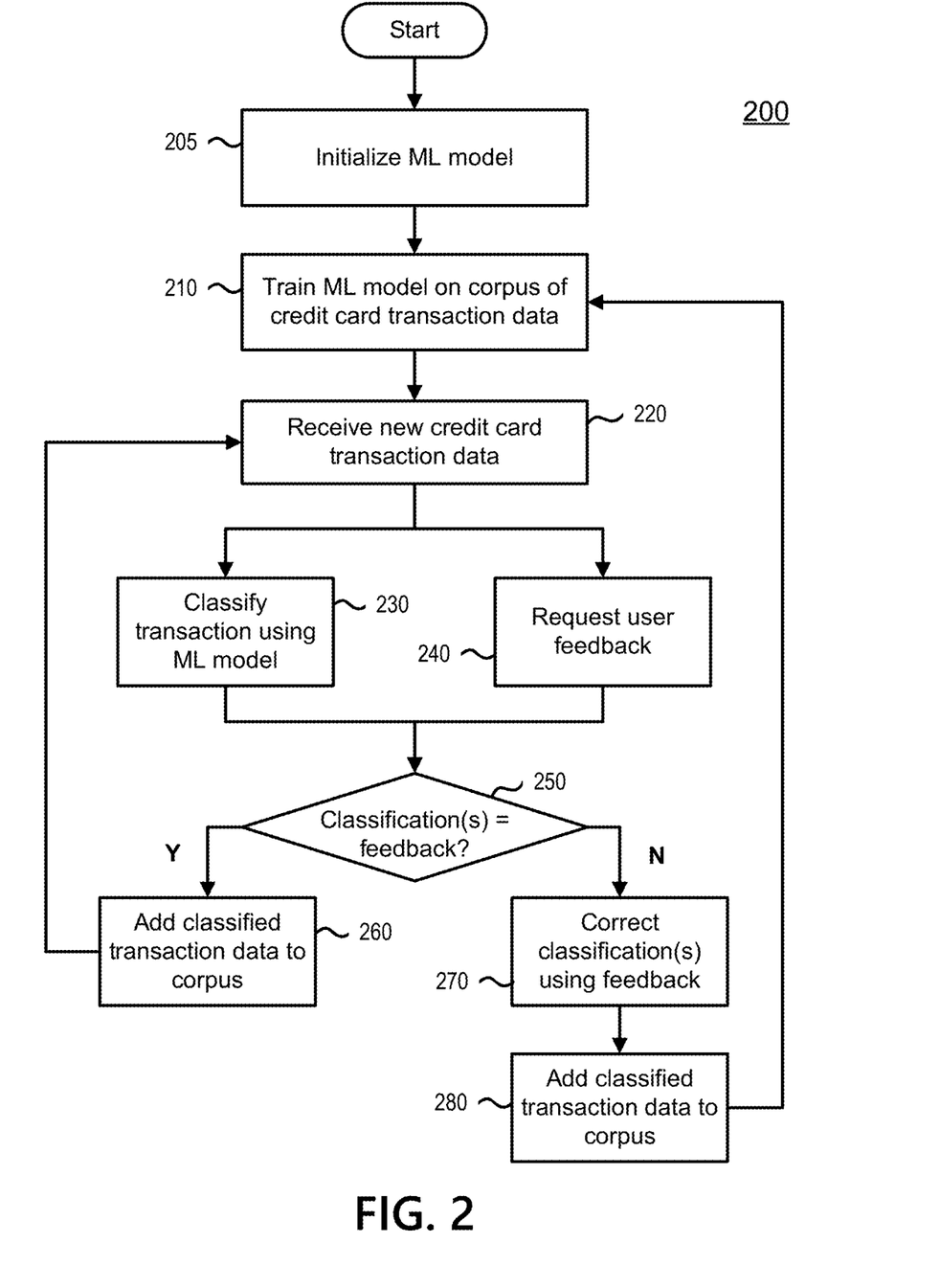
FIG. 2 shows an example flow chart for a method of training a model according to one or more aspects of the disclosure.

FIG. 2 illustrates an example method 200 for training a model to classify transactions in accordance with one or more aspects described herein. As used herein, a model may be a machine learning (ML) model used by a machine learning algorithm to classify transactions, as described herein. Method 200 may be implemented by a suitable computing system, as described herein. For example, method 200 may be implemented by any suitable computing environment by a computing device and/or combination of computing devices, such as computing devices 101, 105, 107, and 109 of FIG. 1. Method 200 may be implemented in suitable program instructions, such as in machine learning software 127, and may operate on a suitable training set, such as training set data 129.

At step 205, the system may initialize a model. The model may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The model may be assigned one or more initial outputs based on one or more transaction parameters, such as the parameters described above (e.g., merchant name, merchant type, product name, and/or product type). The one or more initial outputs may be hard-coded. For example, the model may initially classify transactions from "Amazon.com" as including a shipped product. Transaction parameters may be assigned weights for use by the model in classifying transactions. For example, hardware stores may be weighted in favor of a product not involving shipping, while online stores may be weighted in favor a

TABLE 1

Database Table of Credit Card Transactions

| ID | Price | Classification | Merchant Name | Merchant Type | Product Name | Product Type | Shipped? |
|---|---|---|---|---|---|---|---|
| 1 | $2000 | Card Present | Home Depot | Hardware Store | — | Appliance | N |
| 2 | $23.14 | Card Not Present | Amazon.com | Online Store | Charmin | — | Y |
| ... | ... | ... | ... | ... | ... | ... | ... |
| n | $15 | Card Not Present | Netflix | Streaming Service | — | Digital Video | N |

Saved data may provide a corpus of information for use by a machine learning algorithm. A machine learning algorithm may use such a corpus as a basis for training a machine learning model. The machine learning model may be used to better predict classification of future transactions and/or determine if a transaction includes, or does not include, a product being shipped to the user based on one or more categories of data associated with the transaction. As the model trains on more and more data, the machine learning algorithm may not only more correctly predict whether a product will be shipped, but also may be able to fill in product involving shipping. The initial model assignments may also be set to other initial values or not set at all.

At step 210, the system may train the model through a model training process. The model may be trained using supervised learning, unsupervised learning, back propagation, transfer learning, stochastic gradient descent, learning rate decay, dropout, max pooling, batch normalization, long short-term memory, skip-gram, or any equivalent deep learning technique. The system may select a corpus of training set data. The corpus of training set data may comprise one or more past, and/or hard-coded, transactions.

In some examples, the transactions may comprise transactions verified by one or more end-users and may referred to as verified transactions. In addition to verified transactions, the system may send an inquiry (e.g., survey) to the purchaser. The inquiry (e.g., survey) may comprise one or more questions about the good and/or product. The system may receive the responses, which may be incorporated in the corpus. The corpus may be formatted in any form suitable for reading by the system. For example, the corpus may comprise a form similar to that shown in Table 1 above. Additionally or alternatively, the corpus may be stored in one or more databases. In this regard, the corpus may comprise transaction data (e.g., the product, the good, a UPC, a SKU, purchase price, etc.), shipping information, responses from one or more users, etc. Aggregating transaction data from a plurality of users may provide higher confidence for the model classifying future transactions for a wider population of users. The system may train the model, based on the corpus, to refine the model through a plurality of iterations. Throughout the training process, transaction parameters may be assigned, or reassigned, weights favoring a classification for the model to output.

During the training process, the system may determine an accuracy or confidence level of the current model. The system may determine a number of correctly and/or incorrectly classified example transactions and may compute a corresponding accuracy and/or confidence level for the current model. The model training process may be configured with a tunable accuracy and/or confidence level threshold and/or an iterations threshold as part of the training process. The model may continue being trained until the accuracy and/or confidence level threshold is met and/or the iterative threshold is met. As described herein, the model may also be trained during use as transactions are received. Additionally or alternatively, the model may be trained continuously. In this regard, the model may be updated as an iterative process and/or feedback loop to improve the classification process.

At step 220, the system may receive new transaction data. The transaction data may be received when a user makes a purchase. The transaction data may also be received as part of the training process to test the model's accuracy. Additionally or alternatively, the transaction data may be received as a potential future transaction to determine a classification of the potential future transaction. New transaction data may include one or more of the parameters the model is being trained to weight. For example, new transaction data may include parameters as shown in a row of Table 1 above. After receiving the new transaction data, the system may proceed to classify the transaction using the model at step 230. The system may also proceed, at step 240, to request user feedback to confirm transaction parameters and/or classification of the new transaction, as described above.

At step 230, the system may classify the new transaction data using the trained model. Classification may include an indication of whether or not the purchased product is being shipped to the user. A determined classification may be output based on values of transaction parameters associated with the transaction and/or weights assigned to those transaction parameters during the model training process. The classification process may also include assigning values to any missing transaction data, as described herein. For example, the model may classify the "Product Type" of transaction ID "2" of Table 1 to be "Bathroom Tissue." The assignment of missing values may also be based on weights assigned to parameters; however, such weights may indicate a value is more probable than one or more other values, unlike the binary yes or no of whether or not a product involves shipping.

At step 240, the system may request user feedback. User feedback may be requested in response to a user performing (e.g., conducting) a transaction. The user may be asked to supplement and/or confirm any of the data received as part of the transaction, as described herein. For example, the user may be asked whether or not the purchased product is being shipped to the user. User feedback may be collected immediately after purchase or anytime thereafter. In an example, user feedback may not be collected until after the user receives the purchased product. Step 240 may be performed concurrently with step 230. Alternatively, step 240 may be performed after step 230.

At step 250, the system may evaluate whether the model's classification output matches the received user feedback. As described herein, such a step may allow the system to supplement received transaction data. Such a step may also be used to confirm the accuracy of model classifications. If the model classification(s) match the user feedback, then the method 200 may move to step 260, branch Y, indicating that the model accurately classified the transaction. It should be appreciated that the model classification(s) and/or the user feedback do not need to match exactly. For example, a threshold of similarity may be used to determine which branch the method 200 should continue to. Additionally or alternatively, the system may use fuzzy logic to determine whether the transaction data matches a classification. For example, the user feedback may include a typo and/or a synonym for which the model should not be penalized. To account for such instances, the model may have enumerated values that encapsulate or match to synonyms and/or typos. If the model classification(s) do not match the user feedback, then the method 200 may move to step 270, branch N, indicating the model did not correctly classify the transaction.

At step 260, after determining that the model accurately classified the transaction, the system may add the classified transaction data to the corpus. Adding the transaction data to the corpus may allow the model, or a different model, to train using the benefit of an additional data entry in the corpus. After the classified transaction data is added to the corpus, the method 200 may return to step 220 and process a new transaction. Optionally, the method 200 may update the model by training with the addition of the new data entry.

At step 270, after determining that the model did not accurately classify the transaction, the system may correct the model's classification(s) using the user feedback. It should be appreciated that user feedback may take precedence over the classification(s) determined by the model. The method 200 may then move to step 280. At step 280, the system may add the corrected classified transaction data to the corpus so that the model, and/or other models, may train on the corrected data. Training on corrected data may allow the model to avoid making the same, or similar, mistake(s) when classifying future transactions. After the corrected classified transaction data is added to the corpus, the method 200 may proceed back to step 210. At step 210, the model may be retrained, taking the corrected transaction data into account. Alternatively, the method 200 may proceed back to step 220 and process another new transaction. Whether the method 200 proceeds to step 210 or 220 may depend on one or more criterion. In an example, the model may not be retrained until a certain amount of time has passed, a certain number of transactions have been classified incorrectly, one or more new parameters are added to transaction data, and/or a new transaction is not currently available to process. Other criteria and/or thresholds may also be used to determine when the model should be retrained. It should be appreciated that the model may process a new transaction while a copy of the model, or a different model, trains on the updated corpus of data. When the copy of the model or the different model is trained, that newly trained model may then process new transactions. The not-retrained model may then be withdrawn from use.

It should be appreciated that steps 240 to 280 may not be performed each and every time new transaction data is received. For example, one or more users may not provide feedback, or the feedback may not include an indication of whether the model is correct or incorrect. In instances where user feedback is not requested or provided, method 200 may proceed from step 230 back to step 220 to await the reception of new transaction data.

Method 200 may continue indefinitely to better train ML models and continue classifying new transaction data. Classified transaction data may be useful for determining and/or displaying additional information to users.

How a product is shipped may be important to a user purchasing the product. Various shipping metrics may be used to describe how a product is shipped. Example shipping metrics may include shipping courier(s), time elapsed from purchase to shipping, time elapsed from shipping to receipt, packaging of the product, condition of the packaging upon receipt, condition of the product upon receipt, delivery time of day, whether concurrently purchased products are shipping together or separately, or other shipping details.

The courier service (e.g., delivery service), and additional details associated with the transportation of the product, may be determined from data similar to that described above with respect to determining whether a product will be shipped. Data, such as merchant name, merchant type, product name, and/or product type, may be useful in determining how a purchased product may be shipped to a user. For example, a first merchant may consistently ship products via UPS, while a second merchant may consistently ship products via FedEx®, and a third merchant may ship products via USPS. In addition, a certain product may be shipped via a certain carrier because the product may only be available from a particular merchant and/or the product has characteristics requiring the product to be shipped via the certain carrier. Such product characteristics may include physical dimensions, physical packaging dimensions, weight, composition, and/or other characteristics that may be important when determining how a product may be shipped.

A price of a product may provide insights into how the product is shipped. A product associated with a high price may indicate that a more comprehensive shipping method may be used so that the product may then have a smaller chance of becoming damaged during shipping. Similarly, a product having a lower price may indicate that a less comprehensive shipping method may be used. In an example, an expensive product may include a "white glove" delivery, while a less expensive product may arrive wrapped in packing material.

User feedback may provide additional information and/or insights with regard to manner and/or means of shipping for current and/or future purchases. User feedback may include one or more shipping metrics and/or product characteristics to better inform future purchasers how a purchased product may be shipped and/or received. Shipping metrics may include those described above, such as shipping courier(s), time elapsed from purchase to shipping, time elapsed from shipping to receipt, packaging of the product, condition of the packaging upon receipt, condition of the product upon receipt, delivery time of day, whether concurrently purchased products are shipping together or separately, and/or other shipping details. Product characteristics may include those described above, such as physical dimensions, physical packaging dimensions, weight, composition, and/or other characteristics that may be important when determining how a product may be shipped. User feedback may include reviews of the shipping process and/or product itself. The reviews may be useful to future purchasers when deciding to make a purchase. User feedback regarding shipping may be collected concurrently with user feedback collected during and/or after a transaction, as described above with respect to the method 200 of FIG. 2. User feedback may be collected after the product is received by the user. While user feedback may then be collected twice for a single transaction, the user may respond directly after purchase to help train the machine learning model classify future purchases and then also respond after receiving the product to provide additional feedback.

Shipping data, such as the shipping metrics and product characteristics described above and/or additional data, may be determined from information related to purchase of a product. A receipt of a transaction may provide insights into determining how the purchased product may be shipped. For example, a receipt may include a merchant name, a product name, and/or a price. As described herein, such information may be associated with known or determinable means of shipping. A tracking number associated with the transaction may also provide insights into how a product may be shipped. A tracking number may be provided when purchasing a product. Additionally or alternatively, the tracking number may be associated with one or more of the shipping metrics and/or product characteristics described herein, such as one or more shipping couriers, estimates of the aforementioned time metrics, and/or weight.

Shipping data associated with each transaction may be saved. Such saved shipping data may be saved in any manner allowing the data to be later accessed. For example, the data may be saved in a database in computer memory. Shipping data may comprise parameters that may be saved with the transaction data parameters described herein. The shipping data parameters may be associated with the shipping metrics and/or product characteristics described herein. In an example, shipping data parameters may be saved in additional columns to Table 1 (not shown). Associations may be created between the shipping data and/or data of other transaction categories (e.g., merchant name, merchant type, product name, product type, etc.). Shipping data may also be saved separately from transaction data. The separately-saved shipping data may include one or more of the categories of data saved with the transaction data so that associations may be generated between the shipping data and the data of those categories. Without such associations, future shipping data may be more difficult to determine from past transactions.

Shipping data parameters may be included with other data in a machine learning model's corpus of training data, such as the corpus and model described with respect to FIG. 2. The shipping data parameters may be included with, and referred to as, the transaction parameters described above. Adding the shipping data parameters to the corpus may allow the model to determine how a product purchased via a transaction may be shipped to and/or received by the user. For example, the model may associate one or more shipping data parameters with one or more of a merchant name, a merchant type, a product name, a product type, and/or a price associated with a transaction. The model may then make determinations based on such associations. These determinations may be shown to the user to inform the user how the product may be shipped and/or received. User feedback may confirm and/or correct such predictions for purposes of training the model for future transactions. Other sources of at least a portion of shipping data parameters, such as a receipt or tracking number, may also confirm and/or correct such predictions, and may be used to train the model for future transactions.

A user may prefer shipping data, product characteristics, user feedback, or any combination thereof, to be shown before purchase of a product. Such information may be useful for the user when determining whether to make a purchase. For example, if a merchant is known to ship its products via a specific carrier, the user may wish to know this information for various reasons, such as the user having a poor experience with the specific carrier in the past or the specific courier delivering packages while the user is away, among other reasons.

To provide shipping data to a user before purchase of a product, a system should receive an indication that the user is interested in purchase of the product. Such an indication may be made in various ways. In one example, a user may input data into a user interface to indicate the user's interest in purchasing a product. The user interface may comprise a text box, a button, a dropdown list, a selection, or any other input capable of indicating information to the system. The user interface may comprise a graphical user interface (GUI). The user interface may be displayed to the user, for example, via a smartphone application, a browser application, a browser extension, and/or other computing device application. The user may enter, or select, one or more categories of information associated with the product, such as merchant name, merchant type, product name, product type, and/or price via the user interface. One or more of these categories may be obtained by an image capture device, such as camera scanning of a barcode or taking a picture of the product. One or more of these categories may also be indicated by other sensors associated with the user device, such as a GPS transceiver configured to determine a location of the user device. After the system receives the information, the system may display predicted shipping data associated with the product. As described herein, the predicted shipping data may be determined by a machine learning model, such as the model described with respect to FIG. 2 modified to include shipping data parameters, as described above.

User interest in the purchase of a product may be determined by an application executing on a computing device. For example, the application may monitor use of a web browser by a user. When a user accesses a website using the web browser, the application may determine from content of the website whether the user is interested in purchasing a product. In some examples, the application may comprise a browser extension (e.g., applet, servlet, script, etc.).

Figure 3:
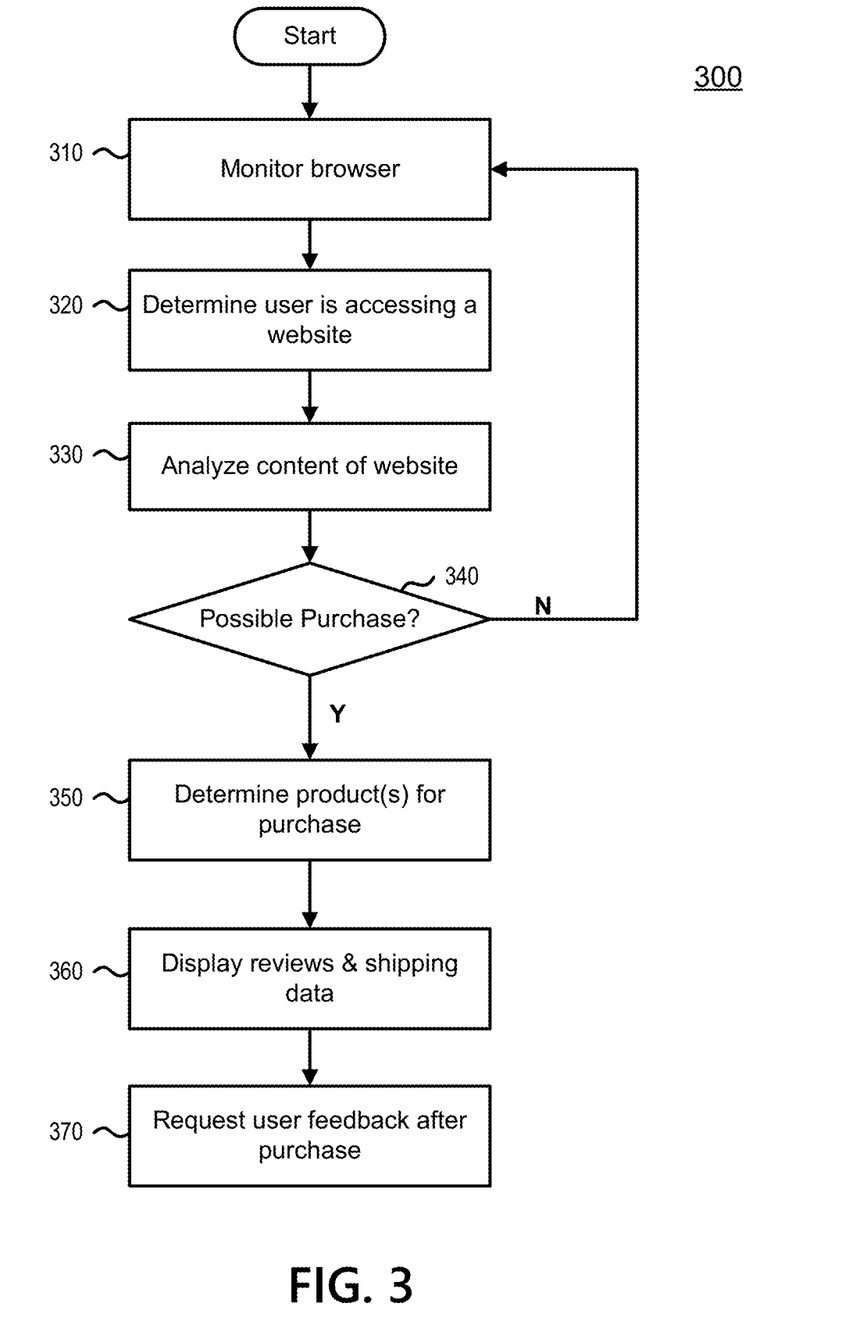
FIG. 3 shows an example flow chart for a method of predicting and displaying shipping data according to one or more aspects of the disclosure.

FIG. 3 illustrates an example method 300 for causing shipping information to be displayed on a user device in accordance with one or more aspects described herein. Method 300 may be implemented by a suitable computing system, as described herein. For example, method 300 may be implemented by any suitable computing environment by a computing device and/or combination of computing devices, such as computing devices 101, 105, 107, and 109 of FIG. 1. Method 300 may be implemented in suitable program instructions, such as in machine learning software 127, and/or other applications 131.

At step 310, the system may monitor use of a browser application. The browser application may be a web browser. Monitoring may comprise tracking processes associated with the browser application. The system may detect the browser application being in an active state, such as by selection in a user interface. Additionally or alternatively, the system may detect user input. The system may also monitor network traffic associated with the browser application. Monitoring may be performed by an operating system process, a browser application, a browser extension, and/or another application.

At step 320, the system may determine that a user is accessing a website via the browser application. The determination may be based on the monitoring indicating the user is using the browser application. For example, the user may have: selected the browser application, made a selection within the browser application, input text into the browser application, and/or any other user action associated with the browser application that is capable of being detected. The system may also detect network traffic is occurring to and/or from the browser application.

At step 330, the system may analyze content of the accessed website. Analysis of the website may be performed to determine if the user of the browser application is shopping. A website name and/or address may provide insight into such a determination. The website the user is accessing may be determined, for example, by analyzing an address bar of the browser application and/or analyzing network traffic. For example, if the user is accessing an online store, such as Amazon.com, the user may be viewing one or more goods that the user is interested in purchasing. The website name may also be determined by analyzing source code of the website. The system may parse source code of the website for additional information. This parsed source code may then be analyzed. Parsing and analyzing the source code of the website may be performed, for example, using a natural language processing model. Parsed source code may be analyzed to search for keywords and/or groups of keywords to determine if the website may comprise an online merchant or otherwise be associated with an online merchant. Analysis of website content may also be performed by a machine learning model. The machine learning model may be trained in a manner similar to the machine learning model described above with respect to FIG. 2. This machine learning model may be trained on a corpus of data associated with parsed website data and/or past purchases of the user to determine whether the website is associated with the sale of products and/or whether the user is likely to purchase a product on the website.

Additionally or alternatively, the system may determine that the user is in a checkout process on a website. For example, the user may have added a product to a cart and begun an online checkout process to pay for the product. Such determinations may be performed by analyzing content of the website, as described above. Additionally or alternatively, these determinations may also be performed by analyzing web addresses, such as uniform resource locators ("URLs"), the browser is accessing as the user progresses through the checkout process. For example, as the user interacts with the website (e.g., clicking buttons and entering billing and shipping details), additional URLs may be accessed to progress from one checkout page to another, until the website confirms purchase of the product. The system may analyze these URLs and determine the user is progressing through the checkout process. Analysis of the web addresses may be performed via address mapping to one or more past or known addresses and/or via parsing one or more addresses.

At step 340, the system may determine whether the website content indicates the user may make a purchase. For example, the system may determine whether the user has begun a checkout process. The determination of an imminent purchase may be based on one or more factors, such as those described with respect to step 330. User feedback may supplement the determination. For example, if the system determines the website content includes a product, the system may prompt the user to confirm this determination. User feedback from prior transactions may also be used. User feedback may be used to improve the training of a machine learning model to recognize whether a user is viewing a product. The techniques used may be similar to how user feedback may be used to train the machine learning model described with respect to FIG. 2. If the system determines the user may make a purchase, the method 300 may move to step 350, branch Y. If the system determines the user may not make a purchase, or otherwise does not affirmatively determine that the user may make a purchase, the method 300 may move back to step 310, branch N, and may continue to monitor the browser application. It should be appreciated that when a user completes an online purchase, or the system determines the user is in the process of completing an online purchase (e.g., in a checkout process), the system may store the website name and/or address. Website names and/or addresses known to sell products may be stored and/or catalogued by the system for use in future determinations as to whether a user is shopping. For example, if a future user browses to a website saved by the system, the system may determine the user is shopping.

At step 350, the system may determine the one or more products for purchase. The products may be determined, for example, by parsing and/or analyzing determinations of the website described in prior steps. In instances where the user is progressing through a checkout process, such as described above with respect to step 330, the system may have high confidence in determining the one or more products for purchase, as those products may be the focus of the web sites the user is accessing to complete the checkout process (e.g., those products are itemized in a virtual cart and/or displayed to the user multiple times). However, if the user is not progressing through a checkout process, and/or if more than one product is displayed via the browser application, the system may determine the product or products most likely to be purchased by the user. For example, if multiple products are displayed, the system may determine that the user has previously purchased one or more similar products and may not buy those products a second time. Therefore, the system may assume the user may purchase one or more of the products the user has not yet purchased. Additionally or alternatively, the system may determine that one or more of the products may comprise products the user has purchased more than one time, and the system may assume another purchase of those products. For example, a user may purchase tissues multiple times because tissues are not reusable, and the user may require more. In such a case, the system may determine the user is interested in purchasing the product because the user has not purchased the product within a predetermined period of time. It will be appreciated by those skilled in the art that the system may save current and/or past purchase data associated with a user, including date and time of purchase, and determine trends from such purchase data, including time periods between multiple purchases of the same product and/or a related product.

It will be appreciated that the determination of the one or more products for purchase may comprise determining one or more attributes associated with the one or more products for purchase that may be used as parameter values by a machine learning model. For example, the system may determine a product name, a product type, and/or one or more other attributes associated with the one or more products for purchase that may be used as parameters by the model. The system may also determine the merchant during step 350. The merchant may be determined, for example, by determining the one or more products for purchase. For example, the merchant may be determined by analyzing content of the website. If no known merchant can be identified, the system may use the web address of the website as the merchant name, which may be saved for future product classifications and/or shipping determinations.

The one or more attributes associated with one or more products may be used to query a memory, such as the database or table described above, to obtain (e.g., retrieve) additional information related to the good or product. In this regard, the system (e.g., a browser application or a browser extension executing on the user device) may determine that the user is interested in purchasing the product. The system (e.g., the browser application or the browser extension executing on the user device) may invoke a procedure call (e.g., a backend Application Programming Interface (API)) to obtain additional information about the product and/or good. The additional information may be retrieved from the memory (e.g., database, table, etc.) and returned to the system (e.g., the browser application or the browser extension executing on the user device). The system may cause the additional information to be displayed for the user.

At step 360, the system may display in-context alerts (e.g., shipping data, product reviews, etc.) to the user that is associated with the one or more products, for example, after determining the one or more products for purchase. The in-context alerts may comprise the additional information retrieved from memory. In this regard, the in-context alerts may comprise shipping data, such as shipping metrics, product characteristics, user feedback, and/or any combination thereof. As described above, the shipping data may be based on data from past purchases and/or saved information associated with the merchant and/or product. The shipping data may be based on classifications and/or predictions by a machine learning model, such as the model described with respect to FIG. 2 modified to include shipping data parameters. For example, the one or more products and/or the merchant may be used, by a model, to classify the product and/or predict shipping information for the product. It will be appreciated that if such a machine learning model classifies the product as not being shipped to the user, then no shipping data, or an indication that the product does not involve shipping, may be displayed. User reviews may be displayed for any product, regardless of whether a product is associated with shipping.

At step 360, the shipping data may be displayed, for example, by displaying a visual indicator via a browser application or a browser extension, displaying an overlay within a web browser, editing elements of a webpage for user interaction, displaying a pop-up window, sending a push notification to a device of the user, sending an email to an email address associated with the user, sending a text message to a device of the user, and/or any combination thereof. For example, if a browser application or browser extension is performing browser monitoring, such as that of step 310, the browser application or browser extension may display the relevant information as the user browses/shops on a website. In another example, the system may parse source code of a website and/or edit an element of the source code for a user to interact with and access the information. The edited element may result in a hyperlink, hover-over, and/or other element a user may interact with for display of the information.

Shipping data displayed to the user may be customizable. A user may select one or more means to receive the shipping data. For example, a user may want to receive the shipping data via email and text message, or only via a browser application or browser extension. A user may also set one or more preferences to be notified when one or more shipping data parameters meet one or more criteria specified by the user. Preferences may include shipping data parameters matching specified values, such as a specified courier, a specified merchant name, a specified merchant type, a specified product name, a specified product type, and/or other criteria as described herein. For example, a user may set a preference to be notified when a specified shipping courier is determined to be used for the transaction. Preferences may also include scored user reviews meeting, or not meeting, a specified score threshold. In an example, a user may set a preference to be notified when a user review score, or aggregate user review score, falls below a specified user review score, which may indicate other users had a negative shipping experience. One or more keywords may also be specified by the user, and reviews with such keywords may be displayed to the user. For example, a user may specify the keywords "bad packaging," and user reviews including "bad packaging" may be shown to the user. Customization of user preferences associated with display of shipping data may be performed via use of a user interface associated with the system, such as a GUI, as described herein.

At step 370, the system may collect user feedback after the user purchases and/or receives the one or more purchased products. The user feedback may be tailored to one or more shipping metrics and/or product characteristics associated with reception of the one or more products. This user feedback may be used by the system to supplement and/or confirm the information displayed to the user at step 360. The user feedback may also help train a machine learning model, such as the machine learning model of FIG. 2 modified as described above, that may be used to determine shipping data associated with future possible purchases. User feedback may also include a scored review of the shipping process. The system may aggregate user reviews for display in step 360. For example, a user may rate his/her shipping experience with or without a personal anecdote, and such a review may be displayed to future possible purchasers as those purchasers experience step 360. Scored reviews may comprise any suitable rating system including, for example, a rating in the range 1-10, a binary positive/negative rating, a rating in the range of 1-5 stars, and/or any other scoring scheme capable of indicating a positive, negative, or somewhere-in-between experience.

Method 300 may be repeated each time a user accesses a monitored browser application to better inform users of their possible purchases before completing those purchases. It should be appreciated that the methods shown in FIGS. 2 and 3 may be performed separately or in conjunction with one another. For example, step 370 of FIG. 3 may be performed concurrently with step 240 of FIG. 2. Combining these steps may avoid prompting the user too many times. Similarly, if a user makes a purchase during method 300, step 220 of method 200 may be invoked, while method 300 may progress through its remaining steps.

Figure 4A:
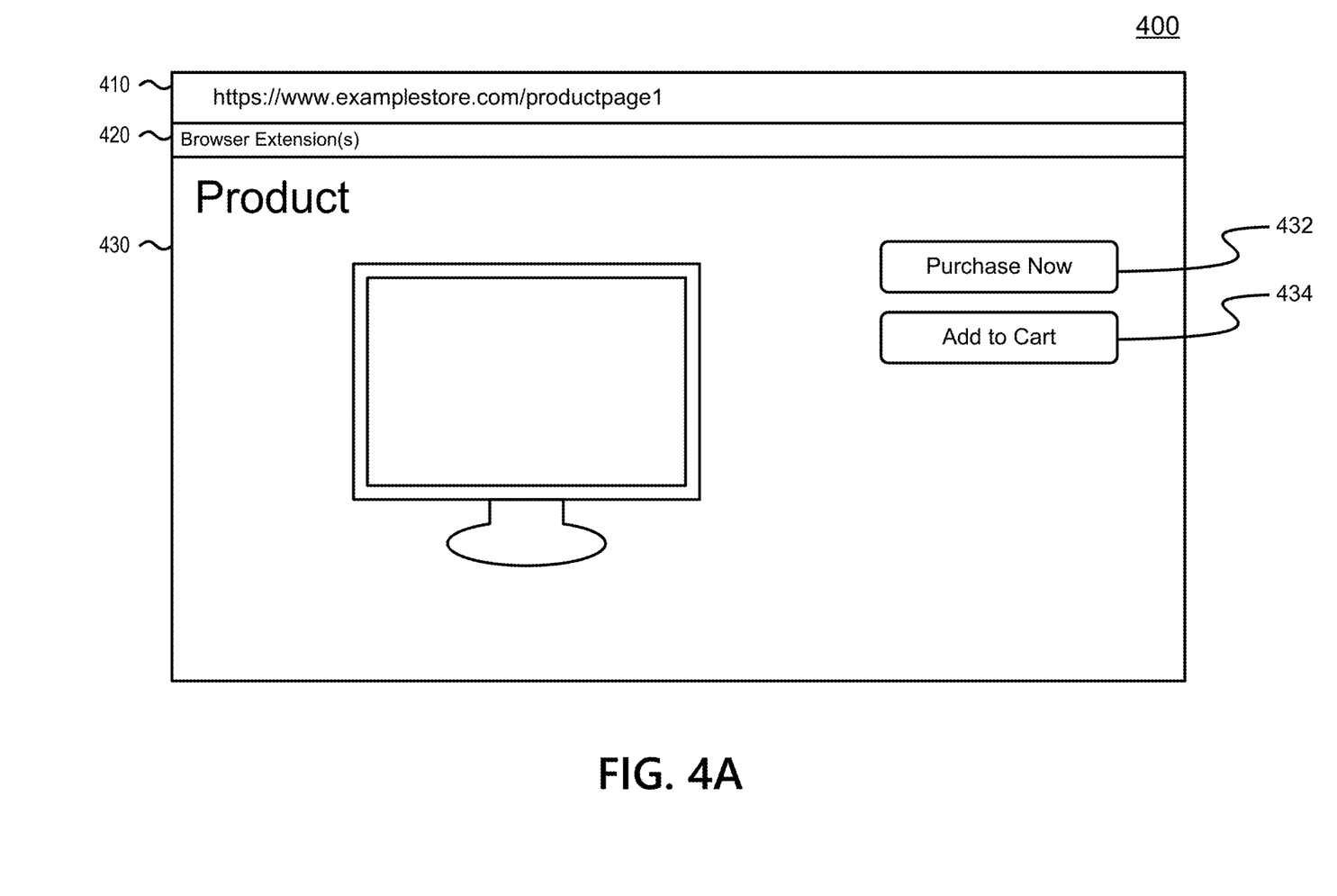
FIGS. 4A and 4B show an example of a web browser displaying in-context alerts in accordance with one or more aspects of the disclosure.
Figure 4B:
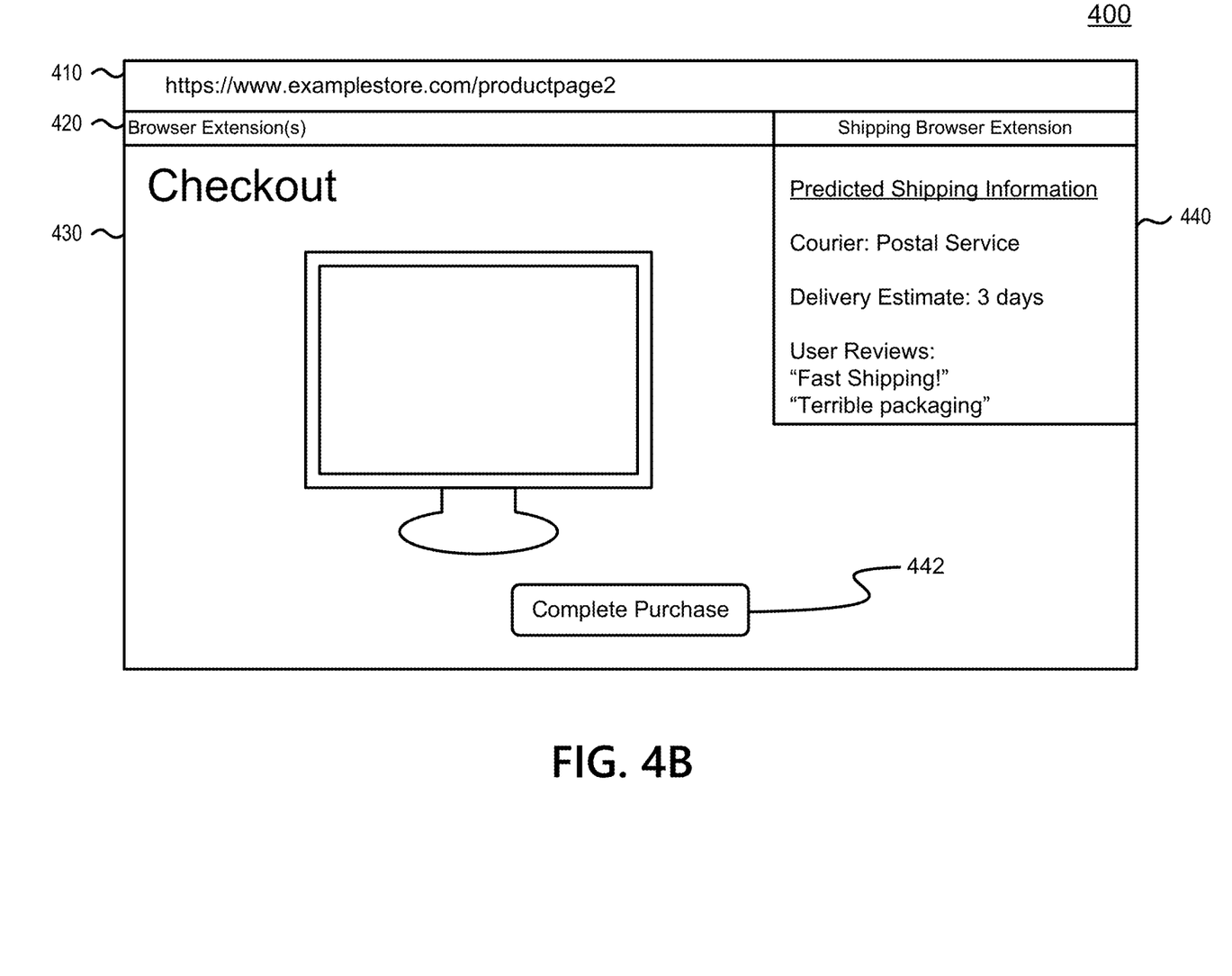

As described above, the system described herein may provide additional information about a product and/or good prior to completing a purchase. FIGS. 4A and 4B show an example of a web browser displaying in-context alerts in accordance with one or more aspects of the disclosure.

FIGS. 4A and 4B show an example of web browser 400. Web browser 400 may comprise an address field 410, one or more browser extensions 420, and a browser pane 430. The address field 410 may be an address bar. A user may enter (e.g., type) an address (e.g., IP address, uniform resource locator (URL), etc.) in address field 410. Browser 400 may comprise one or more browser extensions 420. The one or more browser extensions 420 may comprise a browser extension to display additional information about a product when the user is shopping. Browser pane 430 may display one or more pages associated with the address entered in address field 410. As shown in FIG. 4A, browser 400 may display a product page associated with a monitor. The product page displayed in browser pane 430 may comprise first button 432 and a second button 434. The first button 432 may allow the user to purchase the product immediately (e.g., "Purchase Now"), while the second button 434 may allow the user to add the product to their shopping cart (e.g., "Add to Cart") and continue shopping. The user may wish to complete their purchase.

FIG. 4B shows an example of browser 400 displaying a checkout page according to one or more aspects of the disclosure. Browser 400 may comprise the address field 410, one or more browser extensions 420, and the browser pane 430. Browser pane 430 may display a "Checkout" page in response to determining that the user wishes to complete their purchase. One or more browser extensions 420 may recognize that the user is about to complete a purchase. As noted above, the one or more browser extensions 420 may analyze browser pane 430 to obtain information about the product, such as the product, the price, the shipping details, merchant information, etc. The one or more browser extensions 420 may invoke a procedure call (e.g., API) to query a database using the information obtained about the product. In response to the query, the one or more browser extensions 420 may receive additional information about the product. As noted above, the additional information may comprise shipping details associated with the product and/or merchant, product reviews, etc. The additional information may be displayed, for example, in window 440. In some instances, window 440 may be a pop-up window. In this regard, the user may be provided with additional information that may not be available via the merchant's website prior to completing their purchase.

The techniques described above may provide additional information to users contemplating purchasing one or more products. User reviews and/or shipping information may be displayed to a user before purchase of a product, better informing a user's decisions when contemplating purchase of the product. Machine learning models may be used to better classify credit card transactions and predict merchant shipping behavior to avoid user surprises during the purchasing process.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like, that perform particular tasks or implement particular data types when executed by a processor in a computer or other device. The modules may be written in a source code programming language that is subsequently compiled for execution, or may be written in a scripting language such as (but not limited to) HTML or XML. The computer executable instructions may be stored on a non-transitory computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A computer-implemented method comprising:
monitoring, via a browser extension executing on a user device, use of a browser application, wherein the browser extension comprises a machine learning model trained to classify transactions and predict shipping data;
parsing, based on monitoring the user of the browser application, source code of a website being accessed by a user;
analyzing, by the browser extension and using natural language processing (NLP), the parsed source code of the website for one or more first keywords associated with an online merchant,
analyzing, based on a determination that the website is associated with the online merchant and by the browser extension and using NLP, the parsed source code for one or more first keywords associated with the website to determine if the user is shopping for a service;
classifying, based on a determination that the user is shopping for a first service, the first service with an indication that the first service does not require shipping;
analyzing, based on the classifying and by the browser extension and NLP, the parsed source code for one or more second keywords associated with the website to determine if the user is shopping for a product;
classifying, based on the analyzing and using the machine learning model, the product as a physical product involving shipping to the user, wherein attributes of the product and the online merchant are inputs to the machine learning model;
predicting, using the machine learning model and based on the classifying, shipping data associated with at least one of: the physical product or the online merchant; and
causing, prior to the user completing purchase of the product, display of the shipping data, wherein the shipping data comprises:
an indication of a user preference for a courier used by the online merchant; and
a predicted condition of a packaging of the product upon receipt of the package based on data retrieved from one or more of: one or more social media reviews or previous user feedback data.

2. The method of claim 1, wherein the machine learning model is initialized with a plurality of credit card transaction parameters, wherein the plurality of credit card transaction parameters are associated with at least one of: a plurality of users, a plurality of merchants, or a plurality of products.

3. The method of claim 2, wherein the plurality of credit card transaction parameters comprise at least two of: a merchant name; a merchant type; a product name; a product type; a price; a "card present" or "card not present" classification; an indication of whether the product involves shipping; one or more shipping courier(s); a time elapsed from purchase of the product to shipping of the product; a time elapsed from shipping of the product to receipt of the product; packaging of the product; a condition of the packaging of the product upon receipt; a condition of the product upon receipt; a delivery time of day; or whether concurrently purchased products are shipping together or separately.

4. The method of claim 1, wherein the causing display of the shipping data comprises at least one of: sending a push notification to a device of the user; sending an email to an email address associated with the user; sending a text message to the device of the user; displaying an overlay within the browser application; displaying a pop-up window; editing elements of the website for user interaction; or displaying a visual indicator via a browser extension associated with the browser application.

5. The method of claim 1, wherein the shipping data comprises at least one of: one or more user reviews associated with shipping of the product; one or more predicted shipping courier(s); a predicted time elapsed from purchase of the product to shipping of the product; a predicted time elapsed from shipping of the product to receipt of the product; a predicted packaging of the product; a predicted condition of the packaging of the product upon receipt; a predicted condition of the product upon receipt; a predicted delivery time of day; or a prediction as to whether a second product purchased with the product will be shipped together or separately.

6. The method of claim 1, further comprising:
receiving a tracking number associated with purchase of the product; and
updating the predicted shipping data based on the tracking number.

7. The method of claim 1, further comprising:
receiving a receipt associated with purchase of the product; and
updating the predicted shipping data based on the receipt.

8. The method of claim 1, further comprising:
receiving an indication that the user has purchased the product;
requesting feedback from the user to confirm the predicted shipping data;

updating the predicted shipping data based on the feedback; and training the machine learning model based on the training set and the updated predicted shipping data.

9. The method of claim 1, further comprising:
determining, based on parsing content of the website, that a plurality of products are displayed to the user; and
selecting the product, from the plurality of products, based on a purchase history of the user.

10. The method of claim 1, wherein the determining the user is shopping for a product from the online merchant comprises:
determining, based on parsing content of the website, that the user is in a checkout process on the website; and
determining the product is itemized in the checkout process.

11. The method of claim 1, wherein display of the shipping data is customizable by the user via a browser extension associated with the browser application.

12. The method of claim 1, further comprising:
receiving, from the user, one or more criteria to be met before display of the shipping data, wherein the one or more criteria comprise at least one of: a specified courier, a specified merchant name, a specified merchant type, a specified product name, or a specified product type; and
determining the shipping data meets the one or more criteria before the causing display of the shipping data.

13. The method of claim 1, further comprising:
receiving, from the user, a user review score threshold to be satisfied before displaying the shipping data; and
determining an aggregate user review score of the shipping data is equal to or greater than the user review score threshold before the causing display of the shipping data.

14. The computer-implemented method of claim 1, further comprising:
prior to monitoring the use of a browser application, training the machine learning model, based on a training set comprising a plurality of credit card transactions, to refine a plurality of credit card transaction parameters through a plurality of iterations.

15. The computer-implemented method of claim 1, wherein the indication comprises an alert.

16. An apparatus comprising:
one or more processors; and
memory storing instructions that, when executed by the one or more processors, cause the apparatus to:
monitor use, via a browser extension, of a browser application, wherein the browser extension comprises a machine learning model trained to classify transactions and predict shipping data;
parse, based on monitoring the user of the browser application, source code of a website being accessed by a user;
analyze, by the browser extension and using natural language processing (NLP), the parsed source code of the website for one or more first keywords associated with an online merchant;
analyze, based on a determination that the website is associated with the online merchant and by the browser extension and using NLP, the parsed sourced code for one or more first keywords associated with the website to determine if the user is shopping for a service;
classify, based on a determination that the user is shopping for a first service, the first service with an indication that the first service does not require shipping;
analyze, by the browser extension and using natural language processing (NLP), the parsed source code for one or more keywords associated with the website to determine if the user is shopping for a product;
classify, using a machine learning model, the product as a physical product involving shipping to the user, wherein attributes of the product and the online merchant are inputs to the machine learning model;
predict, using the machine learning model and based on the classifying, shipping data associated with at least one of: the physical product or the online merchant; and
cause, prior to the user completing purchase of the product, display of the shipping data, wherein the shipping data comprises an indication of a user preference for a courier used by the online merchant.

17. The apparatus of claim 16, wherein the instructions further cause the apparatus to:
determine, based on parsing content of the website via the browser extension, a tracking number associated with the product; and
determine, based on the tracking number, at least a portion of the shipping data.

18. The apparatus of claim 16, wherein the instructions further cause the apparatus to:
cause display, via the browser extension, of an overlay within the browser application, wherein the overlay comprises a graphical user interface for user customization of preferences associated with the shipping data.

19. The apparatus of claim 16, wherein the instructions further cause the apparatus to:
modify, via the browser extension, an element of source code of the website, resulting in a hover-over element, wherein the user interacting with the hover-over element causes the display of the shipping data.

20. The apparatus of claim 16, wherein the instructions further cause the apparatus to:
receive, from the user, a user review score threshold to be satisfied before displaying the shipping data; and
determine an aggregate user review score of the shipping data is equal to or greater than the user review score threshold before the causing display of the shipping data.

21. One or more non-transitory media storing instructions that, when executed by one or more processors, cause the one or more processors to perform steps comprising:
monitoring, via a browser extension executing on a user device, use of a browser application, wherein the browser extension comprises a machine learning model trained to classify transactions and predict shipping data;
parsing based on monitoring the user of the browser application, source code of a website being accessed by a user;
analyzing, by the browser extension and using natural language processing (LP), the parsed source code of the website for one or more first keywords associated with an online merchant;
analyzing, based on a determination that the website is associated with the online merchant and by the browser extension and using NLP, the parsed source code for one or more first keywords associated with the website to determine if the user is shopping for a service;

classifying, based on a determination that the user is shopping for a first service, the first service with an indication that the first service does not require shipping;

analyzing, based on the classifying and by the browser extension and using NLP, the parsed source code for one or more second keywords associated with the website to determine if the user is shopping for a product;

classifying, based on the analyzing and using the machine learning model, the product as a physical product involving shipping to the user, wherein attributes of the product and the online merchant are inputs to the machine learning model;

predicting, using the machine learning model and based on the classifying, shipping information associated with at least one of: the physical product or the online merchant;

causing, prior to the user completing purchase of the product and via the browser extension, display of the shipping information and user reviews associated with the product and the merchant, wherein the shipping information comprises:

an indication of a user preference for a courier used by the online merchant; and a predicted condition of a packaging of the product upon receipt of the package based on data retrieved from one or more of: one or more social media reviews or previous user feedback data;

requesting user feedback associated with the product and the merchant; and training the machine learning model based on the training set and the user feedback.

* * * * *